United States Patent
Giridharan et al.

(10) Patent No.: US 9,241,269 B1
(45) Date of Patent: Jan. 19, 2016

(54) METHOD TO IDENTIFY A CUSTOMER ON A WI-FI NETWORK

(71) Applicant: Sprint Communications Company L.P., Overland Park, KS (US)

(72) Inventors: Mohanakrishnan V. Giridharan, Overland Park, KS (US); Ricky A. Hohler, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/328,658

(22) Filed: Jul. 10, 2014

(51) Int. Cl.
| | |
|---|---|
| H04M 1/66 | (2006.01) |
| H04W 12/06 | (2009.01) |
| H04W 4/00 | (2009.01) |
| H04L 29/06 | (2006.01) |
| H04W 12/10 | (2009.01) |
| H04W 12/08 | (2009.01) |

(52) U.S. Cl.
CPC ........... *H04W 12/06* (2013.01); *H04L 63/0815* (2013.01); *H04L 63/0876* (2013.01); *H04W 4/008* (2013.01); *H04W 12/08* (2013.01); *H04W 12/10* (2013.01)

(58) Field of Classification Search
CPC ..... H04W 12/00; H04W 12/02; H04W 12/04; H04W 12/06; H04W 12/08; H04W 12/10; H04W 12/12; H04W 48/00; H04W 48/02; H04W 48/08; H04W 48/16; H04W 48/17; H04W 48/18; H04W 48/20; H04W 4/08
See application file for complete search history.

(56) References Cited

U.S. PATENT DOCUMENTS

| | | | |
|---|---|---|---|
| 8,498,749 B2* | 7/2013 | Imes ................... | G05D 23/1919 62/126 |
| 2002/0032855 A1* | 3/2002 | Neves ............... | H04L 29/12009 713/154 |
| 2006/0126614 A1* | 6/2006 | Logan ........................ | 370/389 |
| 2007/0110035 A1* | 5/2007 | Bennett ............... | H04L 12/2898 370/352 |
| 2008/0281699 A1* | 11/2008 | Whitehead ..................... | 705/14 |
| 2009/0069051 A1* | 3/2009 | Jain et al. ..................... | 455/558 |
| 2010/0118831 A1* | 5/2010 | Chen et al. ................... | 370/331 |
| 2010/0172335 A1* | 7/2010 | Mok ............................. | 370/338 |
| 2013/0090782 A1* | 4/2013 | Yi et al. .......................... | 701/2 |
| 2014/0086177 A1* | 3/2014 | Adjakple ............. | H04W 12/08 370/329 |
| 2014/0112160 A1* | 4/2014 | Kamdar et al. ............... | 370/252 |
| 2014/0310779 A1* | 10/2014 | Lof et al. ......................... | 726/4 |

* cited by examiner

Primary Examiner — Jean Gelin

(57) ABSTRACT

A method of identifying a subscribing customer of a service on a Wi-Fi network is disclosed, the method comprising, in response to selection of an application on a mobile communication device, the application designed to access a service, transmitting either a carrier IP address assigned to the mobile communication device or a media access control address assigned to the mobile communications device, the carrier IP address or media access control address embedded in a payload of an IP datagram over a Wi-Fi network to a server, confirming at the server that the carrier IP address or media access control address belongs to a subscribing customer for the service and that the account of the subscribing customer is in good standing, sending back from the server to the mobile communication device a transmission containing an authentication token, and, granting access to the service to the mobile communication device.

20 Claims, 7 Drawing Sheets

METHOD TO IDENTIFY A CUSTOMER ON A WI-FI NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones that use an iOS-based operating system are popular and widespread. Some popular applications that run on iOS allow customers to access high-density content services, such as movies, from remote servers. Many of these services are restricted to subscribing customers, such as Sprint TV. These high-density video products may benefit from a large bandwidth to transfer to a mobile device for viewing, and thus a Wi-Fi connection is often preferable to using the cellular network.

Some applications, such as those for subscribed high-density content, prefer that the customer be identified prior to delivery of content, to make sure they are a subscribing customer in good standing. Not helping with this, there is no function available to application developers to access the phone number of an iOS-based phone. This makes automatically identifying the user of the mobile phone by the application more difficult. One prior solution is to request the customer to type in a login, such as an ID and a password, before they can access the content each time. Forcing customers to remember one more set of login credentials is a problem for customers, who typically already have a large number of login credentials to remember for several other application-based services. Customers can also find the process tedious and time consuming.

SUMMARY

In an embodiment, A method of identifying a subscribing customer of a service on a Wi-Fi network is disclosed, the method comprising, in response to selection of an application on a mobile communication device, the application designed to access a service, transmitting either a carrier IP address assigned to the mobile communication device or a media access control address assigned to the mobile communications device, the carrier IP address or media access control address embedded in a payload of an IP datagram over a Wi-Fi network to a server, confirming at the server that the carrier IP address or media access control address belongs to a subscribing customer for the service and that the account of the subscribing customer is in good standing, sending back from the server to the mobile communication device a transmission containing an authentication token, and, granting access to the service to the mobile communication device.

In another embodiment, a method of identifying a subscribing customer of a service without logging in is disclosed, the subscribing customer desiring to access the service on an iOS-based mobile communication device, the iOS-based mobile communication device including an application to access the service, the iOS-based mobile communication device further comprising either a carrier IP address assigned to the mobile communication device or a media access control address assigned to the mobile communications device, the iOS-based mobile communication device having a connection to a Wi-Fi network, the method comprising, the subscribing customer selecting the application, the application sending the carrier IP address or media access control address in a payload of an IP datagram over the Wi-Fi network to an authentication server, the authentication server confirming that the carrier IP address or media access control address is associated with the subscribing customer, the service sending back to the iOS-based mobile communication device a first authentication token, the iOS-based mobile communication device using the first authentication token to access the service.

In another embodiment, an apparatus for granting access to a service is disclosed, the apparatus comprising, a mobile communication device belonging to a subscribing customer, the mobile communication device containing at least either a carrier IP address assigned to the mobile communication device or a media access control address assigned to the mobile communications device, the service stored in a remote server, the service requiring either the carrier IP address or the media access control address assigned to the mobile communications device assigned to the subscribing customer before granting access to the service, the apparatus comprising, a memory, a processor, a Wi-Fi transceiver that is active, and, an application stored in the memory that executes on the processor to transmit either the carrier IP address or the media access control address to the service in a payload of an IP datagram via the Wi-Fi transceiver, the service authenticating the carrier IP address or the media access control address and returning via a transmission a first authentication token to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
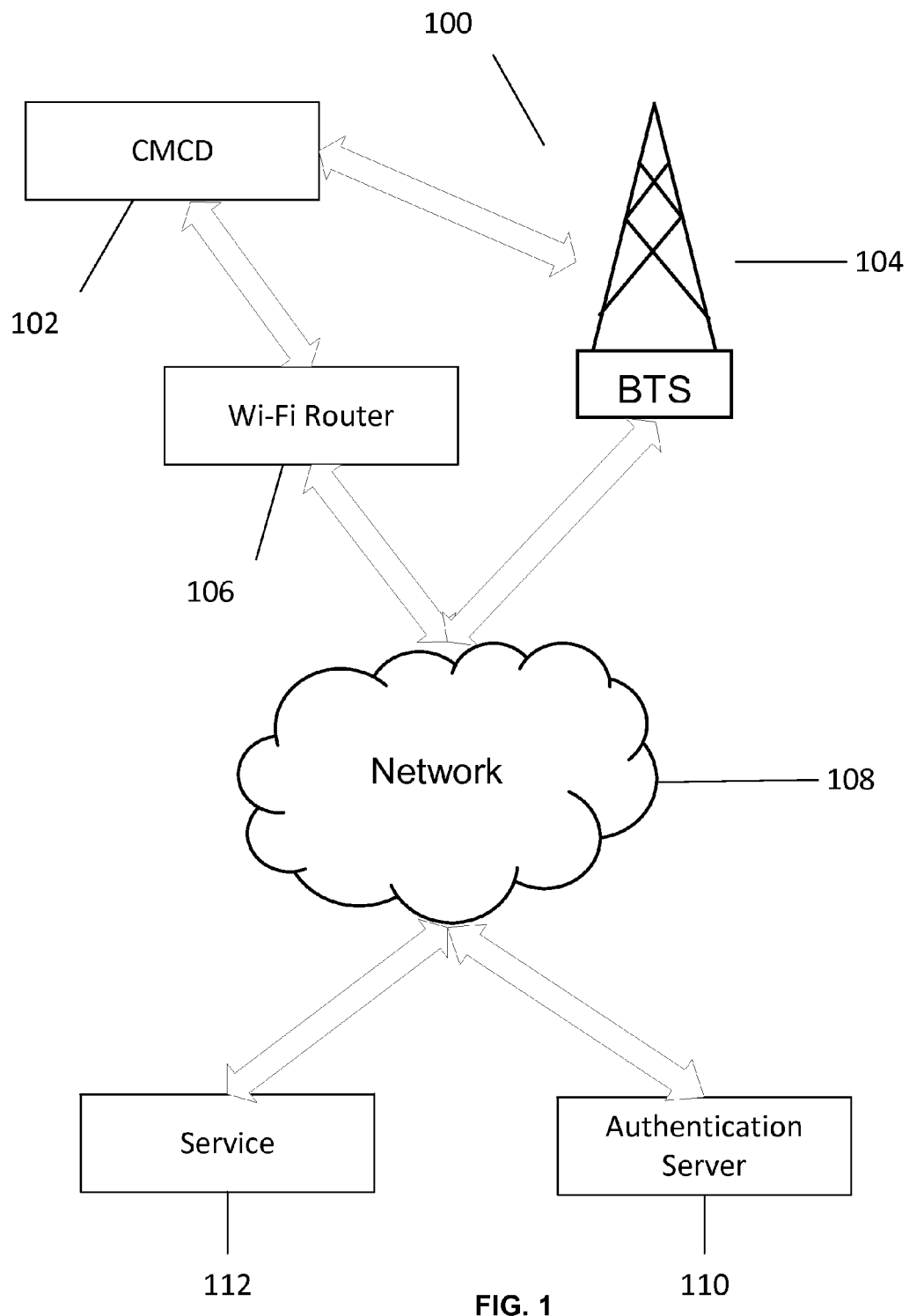
FIG. 1 is an illustration of an apparatus according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Mobile communication devices, such as phones and tablets, which use an iOS-based operating system, are popular and widespread. Some popular applications that run on the mobile communication devices allow customers to access high-density content, such as movies and television shows, from remote servers. Many of these services are restricted to subscribing customers, such as Sprint TV. These high-density video products prefer a large bandwidth to transfer to a mobile device for viewing without interruption, and thus a Wi-Fi connection is often preferable to a cellular network for viewing. Additionally, this content distribution path uses the relatively less expensive land network (e.g., the Internet) and a customer-owned Wi-Fi hotspot, rather than the relatively expensive radio access network of a carrier wireless network.

These subscription-based applications may require the customer to be identified prior to delivery of content, to make sure they are a subscribing customer in good standing. Not helping with this, there is no function available to application developers to access the phone number of an iOS-based phone. The most common prior solution for identifying the customer is to require the customer to type in a login, such as an ID and a password, before they can access the content each time. Forcing customers to remember one more set of login credentials is a problem for customers, who typically already have a large number of login credentials to remember for several other application-based services. Customers can also find the process tedious and time consuming. What is needed is a way for a server to identify the device once without the customer having to remember another login, and then thereafter automatically recognizing the device when the application is accessed.

This can be accomplished on an iOS-based device by selecting an application for a service, the application being able to access a unique identifier of the device and send it to a server that will look up the customer based on the unique identifier, and determine if they are a customer in good standing with a valid subscription. If the customer is indeed in good standing, the server will return an authentication token to the phone, such as a cookie, which may be used thereafter to access the service. In a preferred embodiment, the unique identifier is an Internet Protocol (IP) address allocated to the device by a wireless communication network operated by a service provider. In a preferred embodiment, the server may first return a passcode that the customer will have to enter into the application. After the passcode is entered, the application will contact the server a second time, and this time the cookie will be returned.

Referring now to FIG. 1, a schematic diagram of a system 100 is shown. A customer mobile communications device 102, herein after mobile device 102, is any of a number of different electronic devices as are well known in the industry that are capable of communication using both Wi-Fi and cellular networks. Such devices include cell phones, tablets, and other such devices. The mobile device 102 is able to communicate over a network 108 via both a traditional cellular network via a base transceiver station 104, and via a Wi-Fi router 106. This Wi-Fi router 106 may be the customer's own router at home, or it could be any of a number of accessibility points, such as publicly accessible routers in city facilities, coffee shops, etc. The router 106 could also be a secure router at a place of employment.

When the customer wants to access the subscription service 112 with their mobile device 102, the customer may first obtain authorization to do so. Authorization comes from an authentication server 110. Once the authentication server 110 grants access, the customer is then able to access the service 112, preferably over the Wi-Fi router 106. The service 112 may be on the same server as the authentication server 110, or at a different location.

Figure 2:
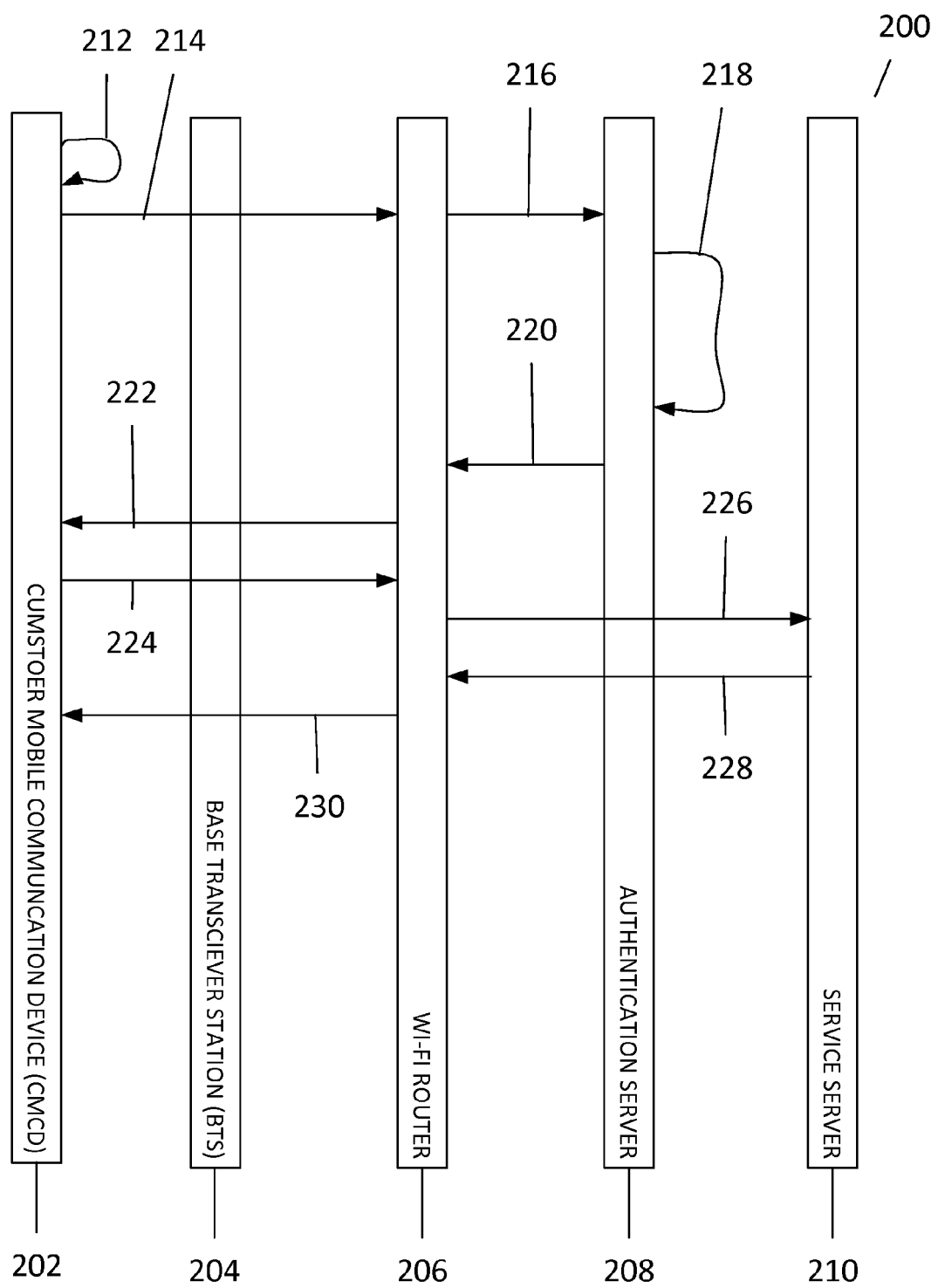
FIG. 2 is a schematic illustrating a method according to an embodiment of the disclosure.

Referring now to FIG. 2, a schematic diagram of a method 200 is shown. To illustrate the sequence of steps and the devices used, each device is shown as a column, and each step is shown as an arrow, with the first step at the top and the last step at the bottom. The relevant devices are the mobile device 202, a base transceiver station (BTS) 204, a Wi-Fi router 206, an authentication server 208, and a service server 210.

The customer activates on their mobile device 202 a subscription-based application which they want to access. The application then looks up 212 a unique identifier that is connected with the mobile device 202. This unique identifier could be a carrier IP address (sometimes referred to as a "carrier network interface connection IP address") which is assigned to the mobile device 202 by a cellular network for communicating over that cellular network. It could also be the media access control ("MAC") address of the mobile device 202, or other unique identifiers that are unique to the specific mobile device 202.

Once the application has the unique identifier, the application bundles the unique identifier up in the payload of an IP datagram and transmits 214 the datagram to the Wi-Fi router 206 in a service request, which then transmits 216 the bundle to the authentication server 208. The datagram may preferable by encrypted. The datagram could instead be transmitted over a cellular network, via the BTS 204. If the datagram is being transmitted via the Wi-Fi router 206 that is proximate the mobile device 202, the IP address in the header of the datagram will be of the router 206, not the mobile device 202. As the unique identifier may be some type of IP address, it is important that the unique identifier be contained within the payload of the datagram so that the authentication server 208 does not get confused with the IP address of the device 206 transmitting the datagram. Regardless, the transmission may be over either a cellular network, or via Wi-Fi.

After the authentication server 208 receives the unique identifier, the server 208 confirms 218 that the unique identifier is tied to a subscribing customer by using the unique identifier to look up the customer and verify their service subscription account is paid up. The authentication server 208 then returns 220 an authentication token to the Wi-Fi router 206, which transmits 222 the token on along to the mobile device 202. The authentication token is one that is appropriate for the particular customer that is associated with the unique identifier and devices owned by the customer, and can be something that can be used in contacting the service server 210 and that will be recognized by the service server 210, such as a cookie. When sent to the service server 210, the token may inform the service server 210 of relevant information regarding the customer and their account, including but not limited to duration of subscription, which content may be accessed, status of customer as authorized and paid up, that the token is still live and preferable speed of download.

Once the application on the mobile device 202 has received the authentication token, the application saves the token for use whenever needed thereafter, so that the token does not have to be obtained from the authentication server 208 every time the customer wants to use the application. Now that the application has the authentication token, the application transmits 224 the authentication token via a service request to the Wi-Fi router 206 which in turn transmits 226 it on to the service server 210. Once received and confirmed by the service server 210, the content requested by the customer is transmitted back 228 via the network to the Wi-Fi router 206 and sent onward 230 to the mobile device 202 for the customer's enjoyment.

While shown here with the steps 214-222 for obtaining the authentication token as being performed using the Wi-Fi router 206, this step could also be performed with the cellular network via the BTS 204. The step 224-230 of accessing the content should preferably be done over Wi-Fi and not a cellular network, as Wi-Fi can handle the high-density throughput better than the cellular network, though it might be possible to view the content over the cellular network. Also, the cost of accessing content over the cellular network would be much higher.

The next time the customer wants to access the service, the application will automatically access the authentication token, and send it to the service server 210, obtaining access to the service. Thereby, the customer will not have to take any steps to access the service, other than starting the application.

The authentication token may have a set lifespan of a predetermined amount of time. An example could be thirty days. In a preferred embodiment, the predetermined amount of time would be equal to how far ahead a subscription has been paid up for.

This embodiment would preferably be used with an iOS-based mobile device, such as an iPhone, iPad, etc. Though this method could also be used with a non-iOS based mobile device.

Figure 3:
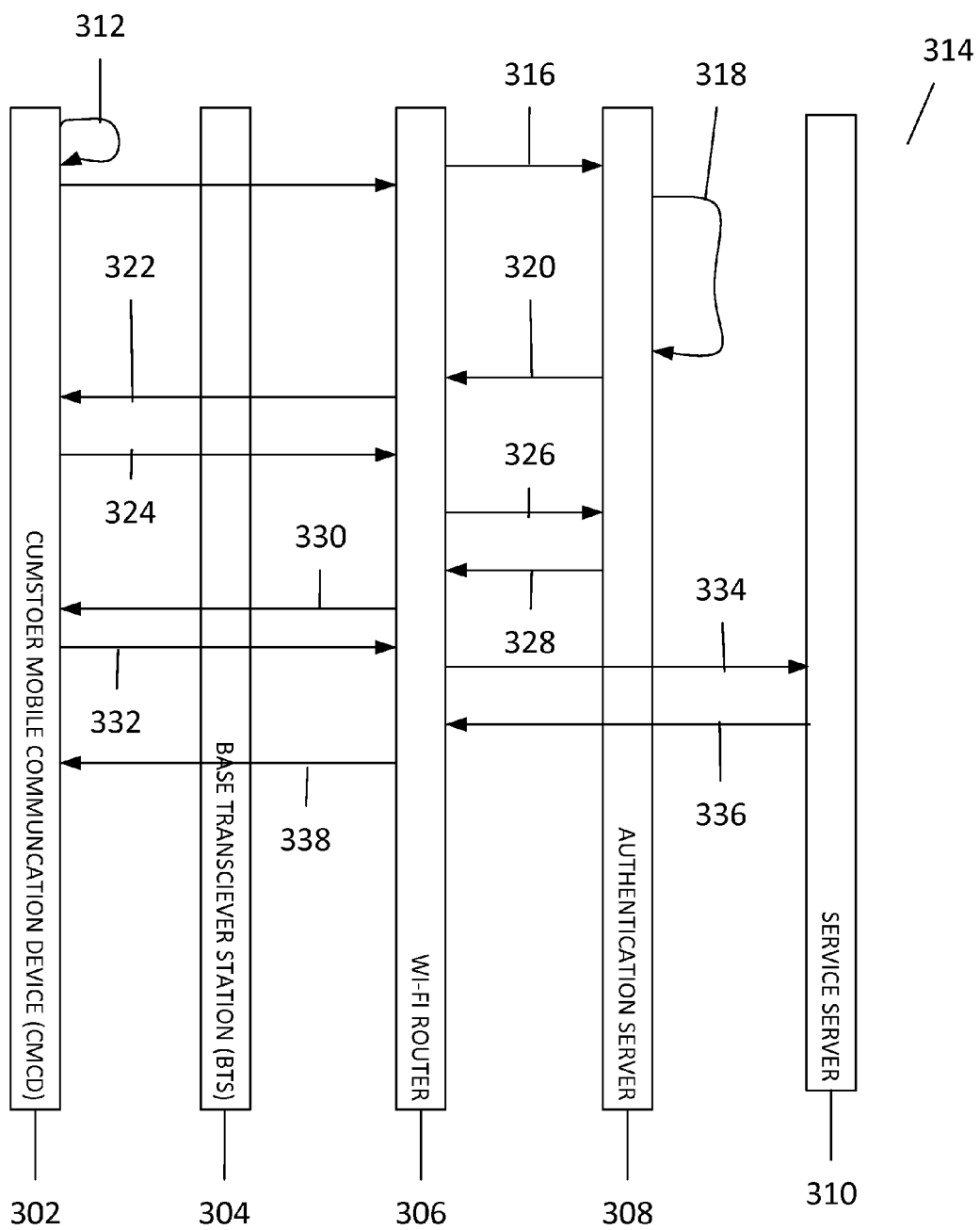
FIG. 3 is a schematic illustrating another method according to an embodiment of the disclosure.

Referring now to FIG. 3, a schematic diagram of a method 300 is shown. To illustrate the sequence of steps and the devices used, each device is shown as a column, and each step is shown as an arrow, with the first step at the top and the last step at the bottom. The relevant devices are the mobile device 302, a base transceiver station (BTS) 304, a Wi-Fi router 306, an authentication server 308, and a service server 310.

The customer activates on their mobile device 302 an application which they want to access. The application then looks up 312 a unique identifier that is connected with the mobile device 302. This unique identifier could be a carrier IP address, which is assigned to the mobile device 302 by a cellular network for communicating over that cellular network. It could also be a media access control ("MAC") address of the mobile device 302, or other unique identifiers that are unique to the specific mobile device 302.

Once the application has the unique identifier, the application bundles the unique identifier up in the payload of an IP datagram and transmits 314 the datagram to the Wi-Fi router 306 via a service request, which then transmits 316 the bundle to the authentication server 308. The bundle could alternatively be transmitted over a cellular network, via the BTS 304. If the bundle is being transmitted via the Wi-Fi router 306 that is proximate the mobile device 302, the IP address in a header of the datagram will be of the router 306, not the mobile device 302. As the unique identifier may be some type of IP address, it is important that the unique identifier be contained within the payload of the datagram so that the authentication server 308 does not get confused with the IP address of the device 306 transmitting the datagram. Regardless, the transmission may be over either a cellular network, or via Wi-Fi.

After the authentication server 308 receives the unique identifier, the server 308 confirms 318 that the unique identifier is tied to a subscribing customer by using the unique identifier to look up the customer as well as their account status, to make sure they are paid-up and in good standing. The authentication server 308 then returns 320 a first authentication token to the Wi-Fi router 306, which transmits 322 the first authentication token on along to the mobile device 302. In a preferred embodiment, the first authentication token is a passcode. The passcode is used to create another level of authentication. The passcode may be transmitted to the mobile device 302 via Wi-Fi as an email, or transmitted to the mobile device 302 via an SMS message over the cellular network.

Once the passcode is received at the mobile device 302, the customer has to read the passcode presented on a display of the mobile device 302, and enter it into the application. The application then sends it back 324, 326 to the authentication server 308 via the Wi-Fi router 306. The authentication server 308 then uses this second authentication to confirm that the correct customer and their mobile device is indeed making the request. The authentication server then sends back 328 a second authentication token to the Wi-Fi router 306, and on 330 to the mobile device 302.

In a preferred embodiment, the second authentication token is a cookie. The cookie is one that is appropriate for the particular customer that is associated with the unique identifier and devices owned by the customer, and can be a cookie that will provide information that the service server 310 will recognize. The cookie may serve to inform the service server 310 of relevant previously saved information regarding the customer and their account, including but not limited to duration of subscription, which content may be accessed, time to live left on the cookie, authorization, and preferable speed of download.

Once the application on the mobile device 302 has received the cookie, the application saves the cookie for use whenever needed thereafter, so that the cookie does not have to be obtained from the authentication server 308 every time the customer wants to use the application. Now that the application has the cookie, the application transmits 332 the cookie in a service request to the Wi-Fi router 306 which in turn transmits 334 it on to the service server 310. Once received and confirmed by the service server 310, the content requested by the customer is transmitted back 336 via the network to the Wi-Fi router 306 and sent onward 338 to the mobile device 302 for the customer's benefit.

While shown here with the steps 314-322 and 324-330 for obtaining the passcode and then the cookie as being performed using the Wi-Fi router 306, this step could also be performed with the cellular network via the BTS 304. The steps 332-338 of accessing the content should preferably be done over Wi-Fi and not a cellular network, as Wi-Fi can handle the high-density throughput better than the cellular network, though it might be possible to view the content over the cellular network.

This embodiment would preferably be used with an iOS-based mobile device, such as an iPhone, iPad, etc. Though this method could also be used with a non-iOS based mobile device.

The next time the customer wants to access the service, the application will automatically access the cookie, and send it to the service server 310, obtaining access to the service, provided a time to live of the cookie has not expired. Thereby, the customer will not have to take any steps to access the service, other than starting the application.

The first authentication token may have a set lifespan of a predetermined amount of time. An example could be five minutes. Alternatively, the lifespan of the first authentication token may be a minute, two minutes, ten minutes, fifteen minutes or some other relatively short time duration. If the customer does not enter the passcode into the application within that time, the first authentication token becomes invalid, and a new first authentication token will be required.

The second authentication token may also have a set lifespan of a predetermined amount of time. In a preferred embodiment, the predetermined amount of time would be equal to how far ahead a subscription has been paid up for. In an embodiment, the lifespan or time to live of the second authentication token may be a day, a week, a month, or another amount of time.

Figure 4:
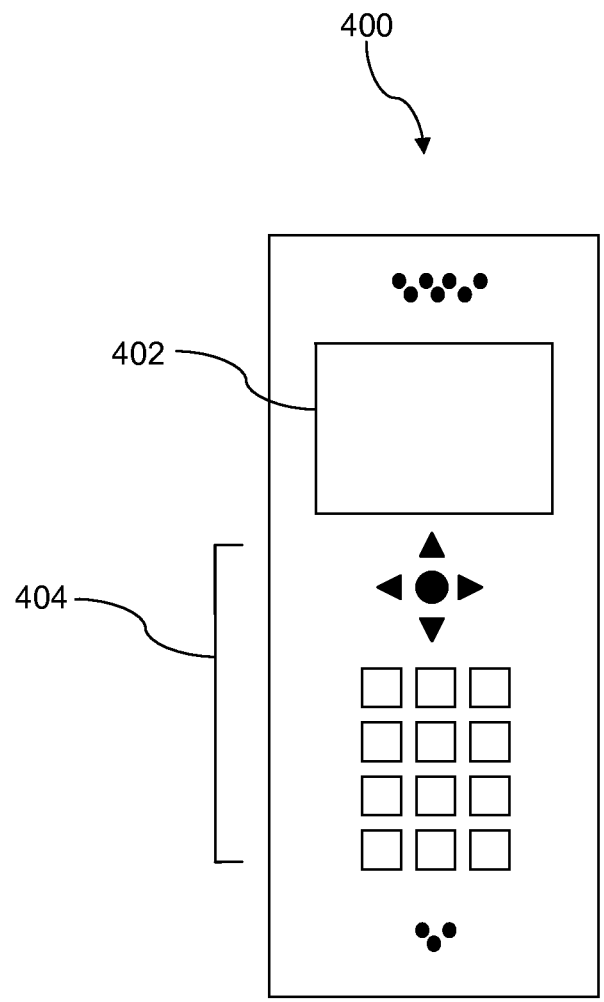
FIG. 4 is an illustration of a mobile communication device according to an embodiment of the disclosure.

FIG. 4 depicts a mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for conFIGuring the operation of the handset. The mobile device 400 may further execute one or more software or firmware applications in response to user commands. These applications may conFIGure the mobile device 400 to perform various customized functions in response to user interaction. Additionally, the mobile device 400 may be programmed and/or conFIGured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
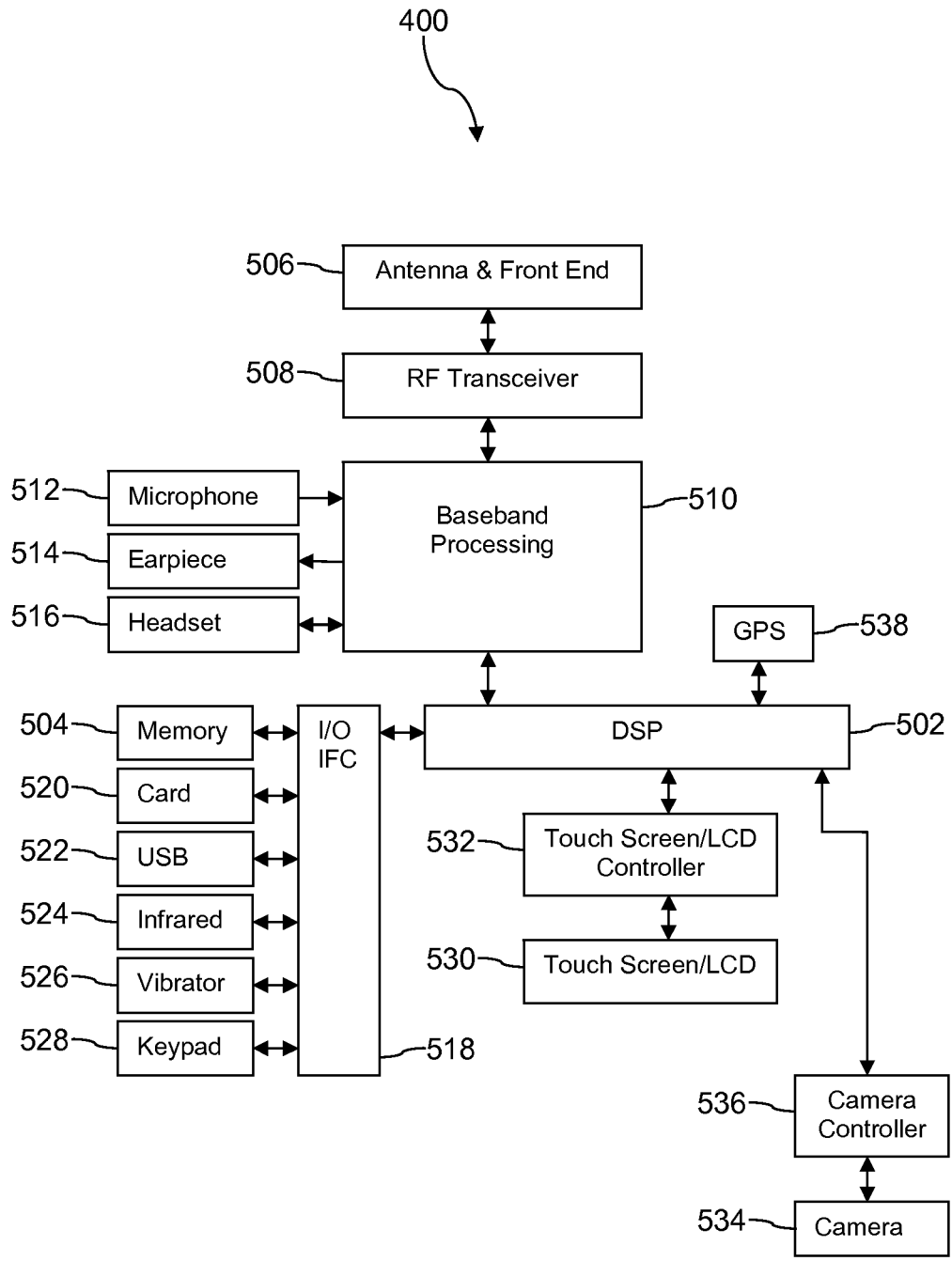
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that conFIGure the DSP 502 to provide the desired functionality, or the application software may be high-level software instructions to be processed by an interpreter or compiler to indirectly conFIGure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to conFIGure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
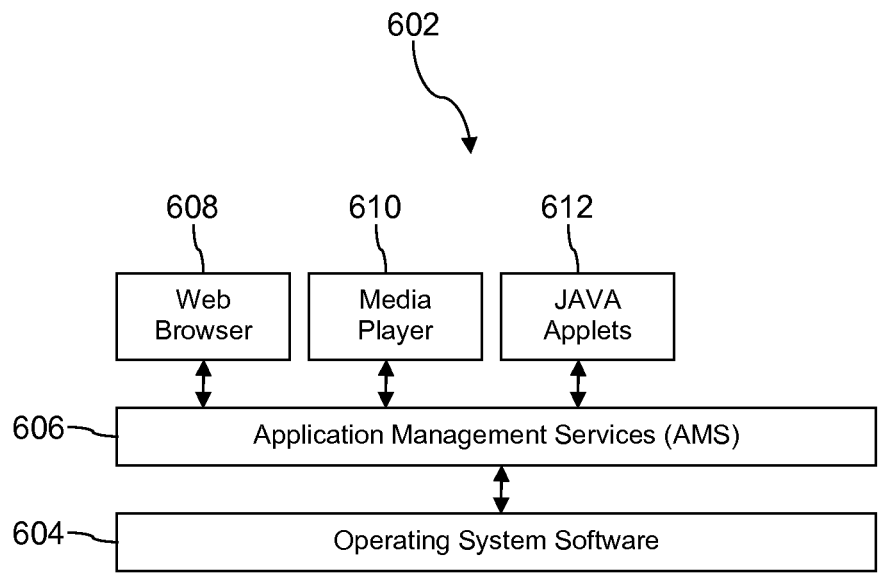
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
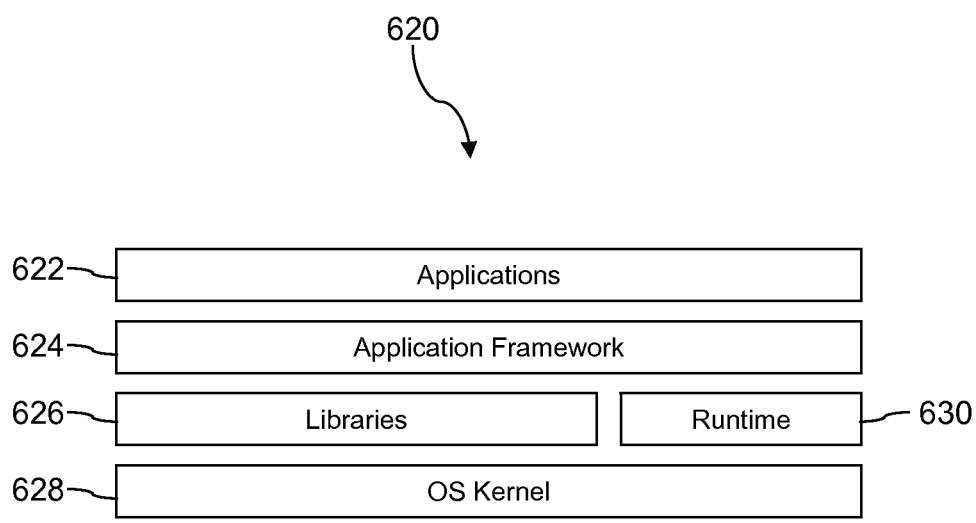
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
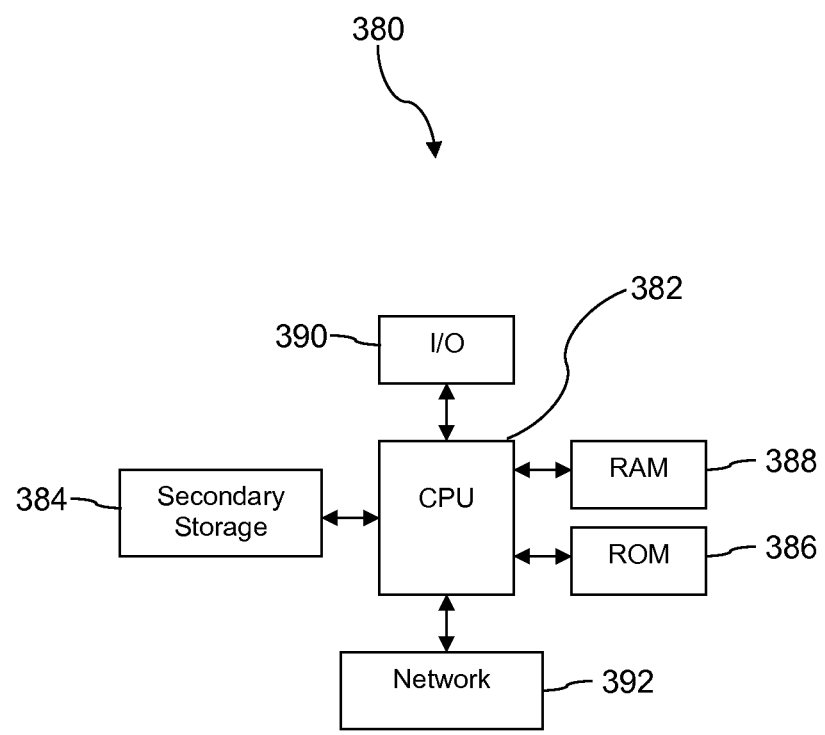
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to conFIGure the CPU 382 to do something, e.g., to conFIGure the CPU 382 to perform the function or functions promoted by the subject application. When the CPU 382 is conFIGured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of identifying a subscribing customer of a service on a Wi-Fi network, the method comprising:
   in response to selection of an application on a mobile communication device associated with a service, receiving, by a server, from the mobile communication device, a carrier IP address assigned to the mobile communication device or a media access control address assigned to the mobile communications device, wherein the carrier IP address or the media access control address is embedded in a payload of an IP datagram received over a Wi-Fi network by the server;
   confirming, by the server, that the carrier IP address or the media access control address belongs to a subscribing customer of the service and that an account of the subscribing customer is in good standing;
   in response to the confirming and without receiving login credentials from the subscribing customer associated with the mobile communication device, sending, by the server, to the mobile communication device, a transmission containing an authentication token; and
   granting access to the service to the mobile communication device based on the authentication token.

2. The method of claim 1, wherein the authentication token comprises a passcode, and the method further comprising:
   receiving, by the server, the passcode from the mobile communication device;
   subsequently sending, by the server, to the mobile communication device, a subsequent authentication token that is used to grant access to the service to the mobile communication device.

3. The method of claim 2, wherein the passcode is transmitted to the mobile communication device using at least one of an SMS message or an email message.

4. The method of claim 1, wherein the mobile communication device is granted access to the service for a predefined amount of time.

5. The method of claim 1, wherein the authentication token is a cookie that is acceptable to the service.

6. The method of claim 1, wherein confirming the carrier IP address or the media access control address is assigned to the subscribing customer comprises looking up the subscribing customer via the carrier IP address or the media access control address.

7. The method of claim 1, wherein the authentication token is sent by the server using one of a cellular network or a Wi-Fi network.

8. A method of identifying a subscribing customer of a service, comprising:
receiving, by a mobile communication device, selection of an application;
sending, by the mobile communication device, a carrier IP address or a media access control address in a payload of an IP datagram over a Wi-Fi network to an authentication server;
in response to the authentication server confirming that the carrier IP address or the media access control address is associated with a subscribing customer of the service and without receiving login credentials from the subscribing customer associated with the mobile communication device, receiving, by the mobile communication device, an authentication token from the authentication server; and
accessing, by the mobile communication device, the service based on the authentication token.

9. The method of claim 8, wherein the authentication token is a cookie, and wherein the mobile communication device accesses the service by sending the cookie in a service request to a service server, the service server controlling access to the service.

10. The method of claim 8, wherein the authentication token is a passcode, wherein the mobile communication device accessing the service based on the authentication token comprises:
receiving, by the application, the passcode inputted by the subscribing customer,
sending, by the mobile communication device, the passcode to the authentication server,
receiving, by the mobile communication device, a subsequent authentication token, the subsequent authentication token comprising a cookie, the cookie thereby granting the mobile communication device access to the service.

11. The method of claim 10, wherein the passcode is transmitted using at least one of an SMS message or an email message.

12. The method of claim 8, wherein the carrier IP address or the media access control address confirmed to be assigned to the subscribing customer by looking up the subscribing customer via the carrier IP address or the media access control address.

13. The method of claim 8, wherein the application is able to access the service for a predetermined amount of time based on the authentication token.

14. A mobile communication device comprising:
a non-transitory memory comprising a carrier IP address or a media access control address assigned to the mobile communication device;
a processor;
a Wi-Fi transceiver; and
an application stored in the non-transitory memory that when executed by the processor, configures the processor to:
in response to selection of an application on the mobile communication device associated with a service stored in a service server, transmit the carrier IP address or the media access control address in a payload of an IP datagram via the Wi-Fi transceiver to an authentication server, and
in response to the authentication server confirming that the carrier IP address or the media access control address is associated with a subscribing customer of the service and without receiving login credentials from the subscribing customer associated with the mobile communication device, receive an authentication token, wherein the mobile communication device accesses the service based on the authentication token.

15. The mobile communication device of claim 14, wherein the authentication token is a cookie, and wherein the mobile communication device accesses the service by sending the cookie in a service request to the service server, the service server controlling access to the service.

16. The mobile communication device of claim 14, wherein the mobile communication device accesses the service based on the authentication token for a predetermined amount of time.

17. The mobile communication device of claim 14, wherein the authentication token is a passcode, and wherein the application is further configured to:
receive the passcode inputted by the subscribing customer,
send the passcode to the authentication server,
receive a subsequent authentication token from the authentication token, the subsequent authentication token comprising a cookie, the cookie thereby granting the mobile communication device access to the service.

18. The mobile communication device of claim 17, wherein the mobile communication device is granted access based on the subsequent authentication token for a predetermined amount of time.

19. The mobile communication device of claim 17, wherein the passcode is transmitted using at least one of an SMS message or an email message.

20. The mobile communication device of claim 14, wherein the carrier IP address or the media access control address is confirmed to be assigned to the subscribing customer by looking up the subscribing customer via the carrier IP address or the media access control address.

* * * * *